Patented Apr. 13, 1948

2,439,729

UNITED STATES PATENT OFFICE 2,439,729

OIL FOR INDUSTRIAL PURPOSES AND MANUFACTURE THEREOF

Henri Martin Guinot, Versailles, and Armand Courtier, Melle, France, assignors to Les Usines De Melle (Societe Anonyme), Saint-Leger-les-Melle, France, a company of France No Drawing. Application May 8, 1945, Serial No. 592,717. In France March 10, 1942

Section 1, Public Law 690, August 8, 1946
Patent expires March 10, 1962

4 Claims. (Cl. 260—671)

It has already been shown that naphthalene can be alkylated by being reacted with olefines in the presence of aluminium chloride. High boiling hydrocarbons are thus obtained, which are suitable for particular industrial purposes.

As often as not, endeavours are made to produce ethyl derivatives as the latter are manufactured from ethylene which is by far the more available and less costly olefine. However in contradistinction with higher olefines, ethylene can be added to naphthalene only with much difficulty. This is why in accordance with French Patent 628,440, it is necessary to work under pressure and at a high temperature to secure a reaction velocity which is acceptable on commercial scale. Hence large and complicated apparatus are required.

It is an object of our invention to do away with the above drawback; more specifically, our invention has for an object to provide a two step method for producing lubricating oils. According to this invention, a first step of our method is the production of ethylnaphthalenes, ethylene being added to naphthalene at atmospheric pressure by carrying out a special procedure which will be described as the specification proceeds.

In a second step, a supplemental alkylation is performed by means of a higher olefine. The purpose of said second step is to make the naphthalene molecules still heavier with a view to producing lubricating oils. To sum up, the latter are obtained by bringing into play a considerable proportion of ethylene and only a small proportion of higher olefine which is more expensive.

It is a feature of our invention that the second alkylation is performed as far as the desired point, so as to obtain required qualities for the lubricating oils thus produced.

According to this invention, addition of ethylene to naphthalene at atmospheric pressure is made possible by working in the presence of benzene, monoethylbenzene or polyethylbenzenes. It is advisable to proceed in accordance with the following directions given solely by way of example. In a vessel provided with stirring means, benezene or homologues thereof and naphthalene are placed, together with an amount of aluminium chloride; the whole is well stirred to suspend aluminium chloride in the liquid, and ethylene is introduced therein. Ethylene absorption takes place immediately at a satisfactory rate as soon as temperature reaches 40° C. Ethylene is fixed at first on benzene but ethyl groups are then capable of migrating onto naphthalene nucleus so that after some time polyethylbenzenes and polyethylnaphthalenes are obtained together. This can be ascertained by fractionating the mixture, polyethylnaphthalenes being liquids of higher boiling point.

After a time of operation, it is found that ethylene absorption weakens then stops. Should the mixture be then fractionated, only a very slight proportion of polyethylnaphthalene lubricating oil would be found. In order to reach the purpose aimed at, it is advisable to produce somewhat heavier molecules from the molecules of polyethylnaphthalenes already formed. To this effect, a higher olefine such as propylene, butylenes or amylenes is substituted for ethylene in the alkylation process. Absorption starts again with utmost easiness without any need for supplemental aluminium chloride. The degree as far as which reaction is to be brought with respect to the oil viscosity that it is desired to secure, can be determined by tests. As a matter of fact, we have found that the heavier the molecules, the more viscid is the oil and vice versa.

When the required amount of higher olefine has been fixed, the process is stopped and the product is decanted to separate the supernatant liquid from the lower layer of aluminium chloride-olefine complex. The liquid is filtered, hydrochloric acid is added thereto then said liquid is washed with alkaline water and finally distilled. The low boiling products are ethylbenzenes and insufficiently alkylated ethylnaphthalenes. They may be used in a further alkylation process and thus indefinitely recycled. Lubricating oil remains as a residue.

Instead of being performed in the presence of benzene or ethylbenzenes, we have found that alkylation may also be carried out in the presence of higher homologues such as toluene, xylenes and the like, and ethyl derivatives thereof. It may be effected at temperatures ranging from about 30° C. to about 130° C. or even 140° C., as it has been ascertained that olefine addition can take place with advantage at temperatures above 100° C.

Finally while ethylene is preferably introduced so long as no further reaction can take place (since ethylene is more available and less expensive than higher olefines and, on the other hand, oils manufactured in accordance with this invention are found to exhibit the better qualities as the amount of ethylene fixed to naphthalene is larger), it is still within the ambit of this invention to stop ethylene addition in the first step before said addition is complete, even if more higher olefine is to be introduced in the second step to secure as heavy molecules as desired.

The following examples which have no limitative purpose will show the manner in which our invention may be carried out.

*Example 1.*—In an aluminium vessel having a capacity of 200 litres and provided with stirring means

| | Kilograms |
|---|---|
| Benzene | 70 |
| Naphthalene | 25 |
| Aluminium chloride | 5 | were placed. The whole was heated to 80° C. and dry ethylene was introduced with good stirring. Ethylene absorption took place immediately at high speed, about 5 cbm. per hour. The reaction proceeded very regularly, then began to slow down. At this time, it was ascertained that polyethylnaphthalenes were formed besides polyethylbenzenes. When ethylene absorption stopped, butylene was admitted instead of ethylene, the bath being kept at the same temperature as before. Reaction took place again with utmost velocity. It was stopped as soon as 9 kg. of butylene had been retained. Aluminium chloride complex was decanted, the hydrocarbon upper layer was filtered out, washed with water and distilled.

The product distilling below 200° C. in a vacuo of 25 mm. was separated; the residue, weighing about 40 kg. was an oil exhibiting a fine reddish yellow fluorescence when seen by transparency and a green fluorescence when seen by reflection. Its viscosity index is −30 for a viscosity of 4.5 degrees Engler at 50° C. Said oil distills from 190 to 230° C. in a vacuo of 17 mm. Hg. It is a lubricating oil of very good quality.

As to the distillate, it was taken up, further amounts of naphthalene and aluminium chloride were added thereto, and the whole was treated for alkylation purpose. As in the former case, ethylene and butylene were fixed again, and so on. In each instance, a substantially equal proportion of lubricating oil was obtained and it was eventually found that after a plurality of operations, 100 kg. of naphthalene resulted in 160 kg. of lubricating oil for which 64 kg. of ethylene and 36 kg. of butylene were used. Moreover 40 kg. of a complex oil were obtained from the aluminic complex by hydrolysing the same. The latter oil exhibits very marked drying properties, whereby it is useful in paints and varnishes as a substitute for linseed oil; it may also be converted to lubricating oil through hydrogenation.

Less amounts of aluminium chloride may be used; in such a case, the proportion of lubricating oil as reckoned on the reacted starting materials increases at the expense of complex oil but the reaction velocity is somewhat lower.

*Example 2.*—122 kg. of diethylbenzene (boiling between 180 and 220° C. under atmospheric pressure) and 25 kg. of naphthalene were put in a vessel. Ethylene was caused to be absorbed as in the foregoing example then, as soon as reaction stopped, propylene was substituted for ethylene; a lubricating oil exhibiting a green fluorescence as the oil described in Example 1 was obtained. Its viscosity index was −25 for a viscosity of 8 degrees Engler at 50° C. The oil distilled from 210 to 250° under a pressure of 17 mm. Hg.

*Example 3.*—400 kg. of polyethylbenzene (B.P. 60–70° C. under a pressure of 255 mm. Hg), 240 kg. of naphthalene and 30 kg. of aluminium chloride were placed in a vessel. Ethylene was caused to be absorbed at a temperature of 90° C. as described in Example 1. When ethylene absorption was ended, i. e. after 200 kg. of said olefine were fixed, temperature reached 110° C. 50 kg. of amylene were introduced into the mixture. After treating the mixture in accordance with Example 1, 440 kg. of a lubricating oil exhibiting the same appearance as those described in the foregoing examples were obtained. Its viscosity index was −10 for viscosity of 50 degrees Engler at 50° C. The oil distilled from 200 to 300° C. under a pressure of 17 mm. Furthermore we obtained 50 kg. of a brown, drying oil from the aluminic complex after hydrolysing the latter.

*Example 4.*—In a steel vessel having a capacity of 250 litres, provided with stirring means, we placed

| | |
|---|---|
| Technical xylene distilling from 130 to 140° C. litres | 95 |
| Naphthalene kg | 25 |
| Aluminium chloride kg | 5 |

The mixture was brought to 110° C. and dry ethylene was caused to be absorbed therein while stirring. At the end of the reaction, temperature had reached 120° C.; 35 kg. of ethylene had been fixed. Butylene was then substituted for ethylene and 10 kg. of butylene were caused to be absorbed.

Finally, after decanting the complex as described in Example 1, the remainder was distilled in a vacuo of 25 mm. That portion of the distillate which passed below 180° C. was recovered for a further batch while 35 kg. of an oil exhibiting a green fluorescence as the oil described in Example 1 was obtained as a residue. Furthermore, we recovered 8 kg. of a drying oil from the aluminic complex.

It is within the scope of the invention to practice our method under a subatmospheric pressure or under a superatmospheric pressure in order to improve to some extent the speed of operation or further to increase the proportion of ethylene incorporated in the final oil. Again we may subject to direct alkylation by means of higher olefines, ethylnaphthalenes which have been previously separated by distillation or in any other manner. Finally instead of aluminium chloride, we may use aluminium chloride-olefine complex which offers the advantage of leading to less coloured oils.

What we claim is:

1. In a process for the manufacture of oils, the step of introducing ethylene at substantially atmospheric pressure into a stirred suspension of an aluminum chloride catalyst in a mixture of naphthalene with at least one substance selected from the group consisting of benzene, ethylbenzenes, benzene higher homologues and ethylbenzene higher homologues, at a temperature from about 30° C. to about 140° C., so as to cause ethylation of naphthalene.

2. A process for the manufacture of oils, which comprises introducing ethylene at a substantially atmospheric pressure into a stirred suspension of an aluminum chloride catalyst in a mixture of naphthalene with at least one substance selected from the group consisting of benzene, ethylbenzenes, benzene higher homologues and ethylbenzene higher homologues, at a temperature from about 30° C. to about 140° C., so as to cause production of ethylnaphthalenes in said suspension; then introducing a higher olefine into said still stirred suspension at said temperature and pressure, so as to cause fixation of alkyl groups higher than ethyl on said ethylnaphthalenes; causing said suspension to settle into a catalyst containing lower layer and a supernatant layer; separating said layers; and distilling said supernatant layer to drive off therefrom that fraction which boils below about 200° C. under a pressure of about 25 mm. mercury.

3. The process of claim 2 which further comprises hydrolyzing said lower layer to produce a drying oil therefrom.

4. An oil which consists mainly of alkyl naphthalenes wherein the alkyl substituents are both ethyl groups and butyl groups, said oil having a boiling range from about 190 to 300° C. under a pressure of 17 mm. of mercury, a viscosity index of −30 for a viscosity of 4.5 degrees Engler at 50° C., and exhibiting a reddish yellow fluorescence when seen by transparency and a green fluorescence when seen by reflection.

HENRI MARTIN GUINOT.
ARMAND COURTIER.

REFERENCES CITED

The following references are of record in the file of this patent:

UNITED STATES PATENTS

| Number | Name | Date |
|---|---|---|
| 1,741,472 | Michel (I) | Dec. 31, 1929 |
| 1,767,302 | Michel (II) | June 24, 1930 |
| 2,071,521 | Hartmann et al. | Feb. 23, 1937 |
| 2,141,593 | Clarke et al. | Dec. 27, 1938 |
| 2,149,762 | Dreisbach | Mar. 7, 1939 |
| 2,225,430 | Fulton | Dec. 17, 1940 |
| 2,306,261 | Crawford et al. | Dec. 22, 1942 |
| 2,324,784 | Lieber | July 20, 1943 |

FOREIGN PATENTS

| Number | Country | Date |
|---|---|---|
| 321,187 | Great Britain | Nov. 1, 1929 |